United States Patent
Reinthaler (10) Patent No.: US 10,407,246 B2
(45) Date of Patent: Sep. 10, 2019

(54) TRANSPORT APPARATUS IN THE FORM OF A LONG STATOR LINEAR MOTOR

(71) Applicant: B&R INDUSTRIAL AUTOMATION GMBH, Eggelsberg (AT)

(72) Inventor: Michael Reinthaler, Pfaffstaett (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/007,713

(22) Filed: Jun. 13, 2018

(65) Prior Publication Data

US 2019/0002204 A1    Jan. 3, 2019

(30) Foreign Application Priority Data

Jul. 3, 2017    (AT) .............................. A 50541/2017

(51) Int. Cl.
| | |
|---|---|
| B65G 23/24 | (2006.01) |
| B65G 21/20 | (2006.01) |
| H02K 41/03 | (2006.01) |
| B65G 23/23 | (2006.01) |
| H02K 1/02 | (2006.01) |
| H02K 1/14 | (2006.01) |

(52) U.S. Cl.
CPC ............ *B65G 23/23* (2013.01); *B65G 21/20* (2013.01); *B65G 21/2018* (2013.01); *B65G 23/24* (2013.01); *H02K 1/02* (2013.01); *H02K 1/14* (2013.01); *H02K 1/148* (2013.01); *H02K 41/031* (2013.01); *H02K 2213/03* (2013.01)

(58) Field of Classification Search
CPC .... B65G 54/02; B65G 21/2018; B65G 21/20; H01F 7/0205; H02K 1/12; H02K 41/02

USPC .......................................................... 198/805
See application file for complete search history.

(56) References Cited

U.S. PATENT DOCUMENTS

| | | | |
|---|---|---|---|
| 1,050,507 A * | 1/1913 | Zeidler .................... | G10C 3/02 |
| | | | 84/179 |
| 6,876,107 B2 | 4/2005 | Jacobs | |
| 8,996,161 B2 * | 3/2015 | Wernersbach .......... | B61L 27/04 |
| | | | 700/213 |
| 9,802,507 B2 | 10/2017 | Clark et al. | |

(Continued)

FOREIGN PATENT DOCUMENTS

| | | |
|---|---|---|
| EP | 2779390 | 9/2014 |
| EP | 3156354 | 4/2017 |

(Continued)

OTHER PUBLICATIONS

Austria Search Report conduced in counterpart Austria Appln. No. A50541/2017 (dated Feb. 19, 2018).

*Primary Examiner* — James R Bidwell
(74) *Attorney, Agent, or Firm* — Greenblum & Bernstein, P.L.C.

(57) ABSTRACT

In order to specify a transport apparatus in the form of a long stator linear motor, by which the negative effects of a non-uniform magnetic flux in the joint region between two adjacent transport segments can be at least alleviated, according to embodiments, the spacing between the coil center of an end coil of a transport segment and the relevant end of the transport segment is smaller than half the tooth pitch of the two adjacent end coils of the transport segments, the tooth pitch of the two adjacent end coils corresponding to the tooth pitch of the drive coils of at least one of the transport segments.

10 Claims, 4 Drawing Sheets

(56) References Cited

U.S. PATENT DOCUMENTS

| | | | |
|---|---|---|---|
| 9,997,985 B2* | 6/2018 | Prussmeier | B65G 54/02 |
| 10,017,333 B2* | 7/2018 | Tamellini | B65G 21/2018 |
| 2003/0230941 A1 | 12/2003 | Jacobs | |
| 2008/0115372 A1 | 5/2008 | Vogel et al. | |
| 2010/0236445 A1 | 9/2010 | King et al. | |
| 2011/0125307 A1 | 5/2011 | Dickson et al. | |
| 2013/0074724 A1 | 3/2013 | King et al. | |
| 2014/0265645 A1 | 9/2014 | Jacobs et al. | |
| 2015/0137625 A1 | 5/2015 | Achterberg et al. | |
| 2015/0283916 A1* | 10/2015 | Coleman | B60L 13/04 104/281 |
| 2016/0218608 A1 | 7/2016 | Floresta | |
| 2017/0029223 A1 | 2/2017 | Reinthaler et al. | |

FOREIGN PATENT DOCUMENTS

| | | |
|---|---|---|
| WO | 2004/103792 | 12/2004 |
| WO | 2013/143783 | 10/2013 |
| WO | 2015/042409 | 3/2015 |

* cited by examiner

TRANSPORT APPARATUS IN THE FORM OF A LONG STATOR LINEAR MOTOR

CROSS-REFERENCE TO RELATED APPLICATIONS

The present application claims priority under 35 U.S.C. § 119(a) of Austria Patent Application No. A50541/2017 filed Jul. 3, 2017, the disclosure of which is expressly incorporated by reference herein in its entirety.

BACKGROUND OF THE INVENTION

1. Field of the Invention

The present invention relates to a transport apparatus in the form of a long stator linear motor comprising at least two adjacent transport segments that are mutually spaced in the longitudinal direction by a segment spacing, a plurality of drive coils that are mutually spaced by a tooth pitch being arranged, in the longitudinal direction, on each of the two transport segments.

2. Discussion of Background Information

In virtually all modern production facilities, it is necessary to move structural elements or components between individual handling or production stations, also over long transport routes, by means of transport apparatuses. A plurality of transport or conveying apparatuses are known for this purpose. Continuous conveyors in various embodiments are often used for this purpose. The various embodiments of belt conveyors are conventional continuous conveyors, in the case of which belt conveyors a rotational movement of an electric drive is converted into a linear movement of the belt conveyor. Conventional continuous conveyors of this kind significantly restrict flexibility; in particular, it is not possible to individually transport separate transport units. In order to meet the requirements of modern, flexible transport apparatuses, what are known as long stator linear motors (LLM) are being used increasingly to replace conventional continuous conveyors.

In a long stator linear motor, a plurality of electric drive coils that form the stator are arranged side-by-side, in a stationary manner, along a transport route. A plurality of drive magnets, either in the form of permanent magnets or in the form of an electric coil or shading coil, are arranged on a transport unit, which magnets interact with the drive coils. The (electro)magnetic fields of the drive magnets and of the drive coils interact in order to generate a propulsive force on the transport unit, which force moves the transport unit forwards. The long stator linear motor can be designed as a synchronous machine, both self-excited and separately excited, or as an asynchronous machine. The magnitude of the propulsive force is influenced, and the transport unit can be moved in a desired manner along the transport route, by means of actuating the individual drive coils in order to regulate the magnetic flux. In this case, it is also possible to arrange a plurality of transport units along the transport route, the movements of which units can be controlled individually and mutually independently by means of the drive coils, which interact with one transport unit in each case, being energized, usually by applying an electrical voltage. A long stator linear motor is characterized in particular by better and more flexible utilization of the movement (position, speed, acceleration) over the entire working region, individual regulation/control of the transport units along the transport route, improved energy utilization, a reduction in maintenance costs due to the smaller number of wearing parts, simple replacement of the transport units, efficient monitoring and error detection, and optimization of the product stream along the transport route. Examples of long stator linear motors of this kind can be found in WO 2013/143783 A1, U.S. Pat. No. 6,876,107 B2, US 2013/0074724 A1 or WO 2004/103792 A1.

The long stator or a transport route is often also constructed in the form of a plurality of route portions which in turn consist of transport segments that are joined together. This modularity makes it possible to construct a long stator linear motor more simply, in particular when defined route portions and transport segments are used. The structural design of the long stator linear motor, i.e. for example the design of the drive coils, the conveying route, the transport units, the guides of the transport unit, etc., can of course be different, the basic operating principle of a long stator linear motor remaining the same however. Despite the many advantages of a modular structure of a transport route using individual transport segments, there are also disadvantages. For example, it is necessary to compensate for thermal expansions of a transport route or of transport segments, which expansions occur due to increased temperatures during the operation of the long stator linear motor. In order to form the transport route, individual transport segments are generally arranged directly side-by-side in the longitudinal direction without a spacing being provided between the transport segments. In this case, the transport segments are generally designed such that the coil spacing between the edge drive coils of two adjacent transport segments corresponds to the coil spacing of adjacent drive coils within one transport segment. This arrangement of the transport segments has the advantage that a uniform magnetic field is formed not only within one transport segment but in particular also in the region between two transport segments, as a result of which disturbances on the transport unit during operation can be prevented. However, arranging the transport segments directly side-by-side has the disadvantage that it is not possible to compensate for thermal expansions due to temperature fluctuations or it is possible to compensate therefor only inadequately. This can lead to thermal stresses in the transport segments or even deformation of the transport route, which is disadvantageous.

A gap between two transport segments which would make it possible to compensate for the thermal expansions has hitherto been avoided because, in the case of specified transport segments, the gap increases the coil spacing between the edge drive coils of two adjacent transport segments that are separated by the gap compared with two adjacent drive coils within one transport segment. Furthermore, the gap also acts as an air gap for the magnetic circuit in the joint region of two transport segments. This results in a non-uniform magnetic field in the region between individual transport segments, and consequently to disturbances on the transport unit. The non-uniform magnetic field in particular has an undesired negative influence on the uniformity of the movement of the transport unit, and this can be corrected at best only in part, by the regulation of the movement.

WO 2015/042409 A1, US 2011/0125307 A1, US 2003/0230941 A1 and US 2010/0236445 A1 disclose, for example, various embodiments of transport systems for various fields of application, in which long stator linear motors are used. In this case, individual modules of a range of shapes and sizes are connected to form transport systems. However, said documents do not propose a solution to the above-described problem of compensating for thermal expansions or the problem of a non-uniform magnetic flux in the region between two modules.

Although US 2016/0218608 A1 discloses a possibility for increasing the magnetic permeability between individual teeth of individual transport segments by means of bridge elements, said document likewise does not describe a solution for the problem of the thermal expansion of individual transport segments as a result of temperature fluctuations, or propose a solution for the problem of the non-uniform magnetic flux in the region between individual transport segments. In fact, the bridge elements actually prevent or impair compensation of thermal expansions in the longitudinal direction of the transport segments.

SUMMARY OF THE EMBODIMENTS

Embodiments of the invention are directed to specifying a transport apparatus in the form of a long stator linear motor, by which it is possible to compensate for the thermal expansions of transport segments while at the same time preventing the negative effects of a non-uniform magnetic flux in the joint region of two adjacent transport segments.

According to embodiments, the spacing, in the longitudinal direction, between the coil center of an end coil of a transport segment and the relevant end of the transport segment is smaller, in the longitudinal direction, than half the tooth pitch of the two adjacent end coils of the transport segments, the tooth pitch of the two adjacent end coils corresponding to the tooth pitch of the drive coils of at least one of the transport segments. As a result, thermal expansions in the longitudinal direction of the transport segments are made possible. In this case, the small change in the tooth pitch between two end coils as a result of the thermal expansions can be ignored and/or the regulation of the movement of the transport units is entirely capable of compensating for these small fluctuations without having any significant impacts on the movement. In addition, vibration isolation of the adjacent transport segments can be achieved as a result of the mutual spacing of adjacent transport segments in the longitudinal direction.

The tooth pitches of the drive coils of adjacent transport segments are advantageously equal, since this makes it possible to achieve a structure of the drive coils having a continuous substantially equal tooth pitch, as a result of which irregularities in the magnetic field can be reduced.

The maximum segment spacing is advantageously 1% of the average value of the overall lengths of two adjacent transport segments, or is set such that the spacing between the coil center of an end coil of a transport segment and the relevant end of the transport segment corresponds to half the coil width of a drive coil, the outer coil end of the end coil of the relevant transport segment ending flush with the relevant end of the transport segment. As a result it is possible to ensure, despite different overall lengths of the transport segments, that the segment spacing is always sufficiently large to allow thermal expansion of the transport segments and is not too large, so as to minimize the negative influence of a non-uniform magnetic field. It is furthermore ensured that an end coil does not protrude beyond the end of a transport segment.

The minimum segment spacing is preferably set such that, at a defined maximum temperature, the adjacent transport segments do not touch. As a result, it is possible to prevent mechanical stresses in the transport segments which would occur in the event of contact between adjacent transport segments in the case of thermal expansion of the transport segments. Since, due to the known design and the anticipated operation of the long stator linear motor, it is possible to estimate the thermal expansions in advance, said minimum segment spacing can be set in advance.

A preferably resilient, magnetically permeable material is advantageously arranged in the joint region between adjacent transport segments, the magnetic permeability being greater than that of air at least by the factor of 10, preferably by the factor of 100. As a result, the magnetic flux between the adjacent end portions can be increased and the disturbances on the transport units in the region between individual transport segments, resulting from an air gap in the magnetic circuit, can be further minimized.

Further improvements with regard to minimizing disturbances on transport units, which disturbances are caused by a non-uniform magnetic flux, can be achieved if toothlike extensions are provided on the end portions of the transport segments.

Other exemplary embodiments and advantages of the present invention may be ascertained by reviewing the present disclosure and the accompanying drawing.

BRIEF DESCRIPTION OF THE DRAWINGS

The present invention will be explained in greater detail in the following, with reference to FIGS. 1 to 4 which show advantageous embodiments of the invention by way of example and in a schematic and non-limiting manner. In the drawings.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
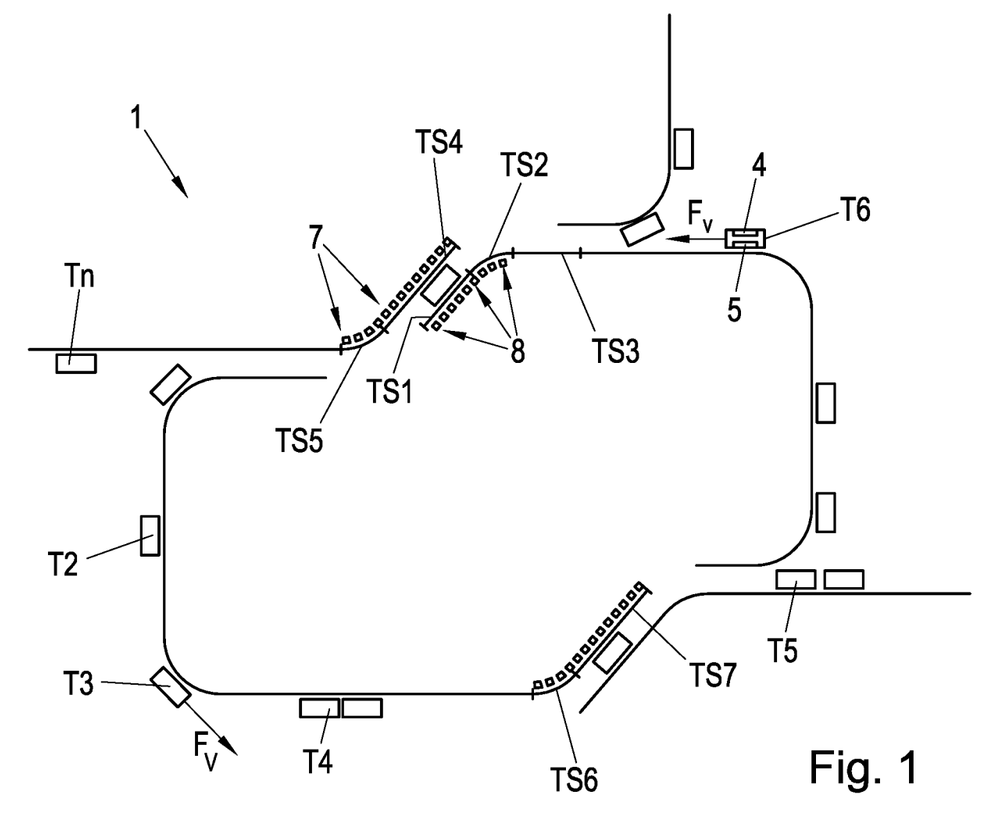
FIG. 1 shows a structure, by way of example, of a transport apparatus in the form of a long stator linear motor.

A transport apparatus 1 in the form of a long stator linear motor is shown by way of example in FIG. 1. The transport apparatus 1 consists of a number of transport segments TSk (in this case k is an index denoting all the present transport segments TS1, TS2, TS3, etc.), of which segments only the transport segments TS1 . . . TS7 are denoted, for reasons of clarity. One transport segment TSk is arranged in each case on one side of the transport route 20. The transport segments TSk form different route portions, for example a straight line, curves having different angles and radii, switches, etc. and can be assembled in a very flexible manner in order to form the transport route of the transport apparatus 1. The transport segments TSk thus together form the transport route 20 along which the transport units Tn (in this case n is an index denoting all the present transport units T1, T2, T3, T4, etc.) can be moved. This modular structure allows for a very flexible design of the transport apparatus 1. In this case, the transport segments TSk are, of course, arranged on a stationary support structure 6 (not shown in FIG. 1).

The transport apparatus 1 is designed as a long stator linear motor, in which the transport segments TSk each form a portion of a long stator of the long stator linear motor, in a manner known per se. Therefore, a plurality of electric drive coils 7, 8 which form the stator and are arranged in a stationary manner are arranged along the transport segments TSk in the longitudinal direction, in a known manner (for reasons of clarity, this is indicated in FIG. 1 only for the transport segments TS1, TS2, TS4, TS5, TS6, and TS7), which drive coils can interact with drive magnets 4, 5 on the transport units T1 . . . Tn (for reasons of clarity, this is indicated in FIG. 1 only for the transport unit T6), in order to generate a propulsive force $F_v$, in a known manner, for moving the transport unit Tn.

Figure 2:
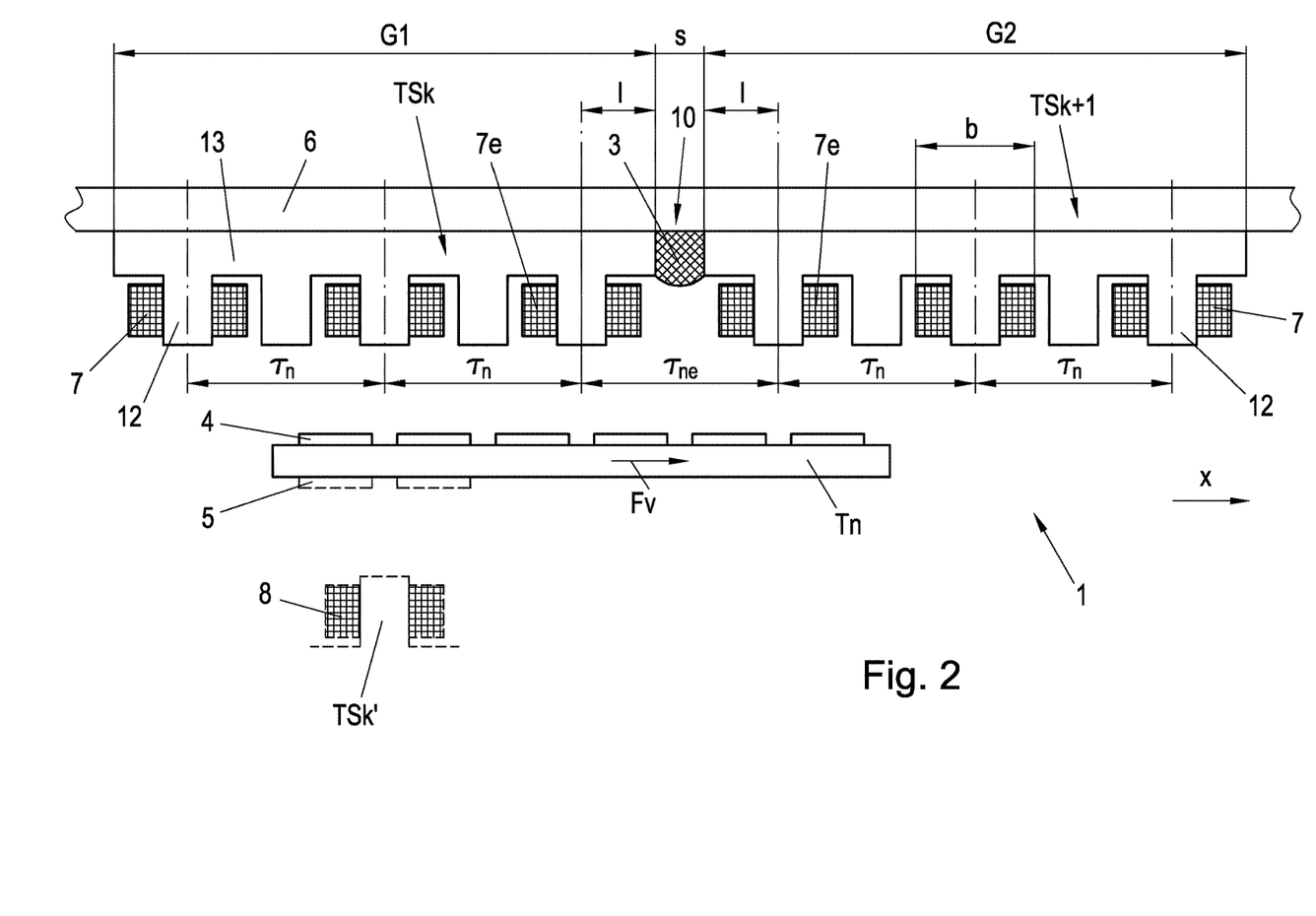
FIG. 2 shows a detail of two adjacent, straight transport segments.

In order to explain the invention, FIG. 2 shows a detail of two adjacent, straight transport segments TSk, TSk+1. In this case, in order to form the transport route 20, the transport segments TSk, TSk+1 are arranged on a stationary support structure 6 or themselves form a portion of the stationary support structure 6. The drive coils 7, 8 of the long stator linear motor are arranged on the transport segments TSk or TSk+1, and the drive magnets 4, 5 are arranged on the transport unit Tn. A drive magnet 4, 5 can be designed as an electromagnet (excitation coils) and/or as a permanent magnet. The invention will be explained in the following with reference to the example of an arrangement of drive coils 7 and associated drive magnets 4 that is single-sided when viewed in the movement direction x, although a double-sided arrangement comprising transport segments TSk, TSk' having drive coils 7, 8, and transport units Tn having drive magnets 4, 5 on both sides is of course also conceivable, as indicated in FIG. 2.

The drive coils 7 are preferably arranged on teeth 12 of a ferromagnetic core 13 (for example an iron laminated core). The drive coils 7 can, however, of course also be designed without a core. Depending on the use, a transport route 20 can be designed so as to be single-sided or double-sided. In the case of a single-sided design, drive magnets 4 (or 5) would then be arranged on just one side of the transport unit Tn, and drive coils 7 (or 8) would be arranged accordingly on the route portion or the transport segments TSk of the route portion. For the sake of simplicity, the invention will be described in the following with reference only to a single-sided embodiment comprising drive magnets 4 and drive coils 7, but the invention of course also includes a double-sided embodiment.

The transport unit Tn is designed such that the drive magnets 4 are arranged opposite the drive coils 7 so that the drive magnets 4 can interact with the drive coils 7 in order to generate a propulsive force Fv. The transport unit Tn can thus be moved along the transport route in the longitudinal direction. Guide elements such as rolls, wheels, glide surfaces, guide magnets, etc. (not shown here for reasons of clarity) can of course also be provided on the transport unit Tn in order to guide the transport unit Tn along the transport route 20 and to hold said transport unit, in particular also when stopped. In this case, for the purpose of guidance, the guide elements of the transport unit Tn interact with the transport route 20, e.g. the stationary support structure 6 or the transport segments TSk, TSk+1, e.g. by means of the guide elements resting on, hooking onto, sliding on or rolling on, etc. the transport route. An air gap is formed between the drive coils 7 and the drive magnets 4, which gap is adjusted and maintained inter alia by the guide elements. In order to generate a magnetic flux that is as uniform as possible in the longitudinal direction x of the transport route 20, i.e. in the movement direction of the transport unit Tn, and thus a uniform propulsive force Fv, the drive coils 7 are usually arranged on the transport segments TSk, TSk+1 so as to have a regular mutual spacing, usually denoted as the tooth pitch $\tau_n$, when viewed in the longitudinal direction (or movement direction) x.

In order to form the transport route 20, individual transport segments TSk, TSk+1 can be arranged, for example on the support structure 6, so as to be mutually spaced by a defined segment spacing s in order to be able to compensate for a thermal expansion of the transport segments as a result of the temperatures occurring during operation. This of course requires the arrangement of the transport segments TSk, TSk+1 to allow such a thermal expansion in the longitudinal direction x. A possibility for an arrangement of this type is described in EP 3 156 354 A1 for example. However, in the case of a specified structural design of the transport segments TSk, TSk+1, said segment spacing s would result in the tooth pitch $\tau_{ne}$ in the joint region 10 of two adjacent transport segments TSk, TSk+1 being greater that the tooth pitch $\tau_n$ within one transport segment. This would result in an undesired non-uniform magnetic flux, and substantially to a weakening of the magnetic flux, in the joint region 10.

In order to maintain a magnetic flux that is as uniform as possible, even over a plurality of transport segments TSk, TSk+1, i.e. even in the joint region 10 between individual transport segments TSk, TSk+1, according to the invention the spacing I (viewed in the longitudinal direction x or the movement direction) between the coil center of an end coil 7e of a transport segment TSk, TSk+1 and the relevant end of the transport segment TSk, TSk+1 is less than half the tooth pitch $$\frac{\tau_{ne}}{2}$$

of the two adjacent end coils 7e of the transport segments TSk, TSk+1. In this case, the tooth pitch $\tau_{ne}$ between the end coils 7e of adjacent transport segments TSk, TSk+1 should correspond to the tooth pitch $\tau_n$ of the drive coils 7 of at least one of the transport segments TSk, TSk+1. Therefore, the drive coils 7 at each start and end of a transport segment TSk, TSk+1 are referred to as end coils 7e. the "end" of a transport segment is the point of the greatest expansion of a transport segment TSk, TSk+1 in the longitudinal direction x.

This ensures that the transport route 20 has a constant tooth pitch $\tau_{ne}$ not only within one transport segment TSk, TSk+1 but in particular also in the joint region 10 between two transport segments TSk, TSk1. This makes it possible to reduce the influence of a non-uniform tooth pitch on the magnetic flux, even in the joint region 10.

At the same time, this ensures that there is in any case a segment spacing s between the adjacent transport segments TSk, TSk+1. Therefore, at a specified tooth pitch $\tau_{ne}$ (which corresponds to the tooth pitch $\tau_n$), the spacing I between the coil center of an end coil 7e of a transport segment TSk, TSk+1 and the relevant end of the transport segment TSk, TSk+1 can only be smaller than half the tooth pitch $$\frac{\tau_{ne}}{2},$$

and therefore a segment spacing s automatically results. This essentially means that the size of the segment spacing s can be specified by selecting the spacing I between the coil center of an end coil 7e of a transport segment TSk, TSk+1 and the relevant end of the transport segment TSk, TSk+1. The segment spacing s additionally results in partial vibration isolation of adjacent transport segments TSk, TSk+1. This means that undesired vibrations are not transmitted, or are transmitted only to a limited extent, from one transport segment TSk to an adjacent transport segment TSk+1. Vibrations can result from the operation of the transport apparatus 1 itself, but can also be transmitted to the transport route 20 and transport segments TSk by external influences, e.g. by vehicles or machines driving past. The partial vibration isolation can reduce disturbing influences, due to vibrations, on the interaction between the transport unit Tn and transport segments TSk, TSk+1 and this contributes inter alia to smoother running of the transport unit Tn.

A transport route 20 of a transport apparatus 1 is usually constructed at ambient temperature, i.e. substantially at room temperature of for example 20-25° C. In the process, the individual transport segments TSk, TSk+1 are advantageously arranged on the transport route 20 such that, at ambient temperature during assembly, the tooth pitch $\tau_{ne}$ between the end coils 7e of adjacent transport segments TSk, TSk+1 corresponds, according to the invention, to the tooth pitch $\tau_n$ of the drive coils 7 of at least one of the transport segments TSk, TSk+1. The tooth pitches $\tau_n$ of the drive coils 7 of adjacent transport segments TSk, TSk+1 are advantageously of the same size. The spacing I between the coil center of an end coil 7e of a transport segment TSk, TSk+1 and the relevant end of the transport segment TSk, TSk+1 can then be set substantially as desired, but according to the invention is in any case less than half the tooth pitch $$\frac{\tau_{ne}}{2},$$

such that, at ambient temperature, a segment spacing s results between the adjacent transport segments TSk, TSk+1. The spacing I is advantageously set such that the segment spacing s resulting therefrom is sufficiently large to allow for any thermal expansion of the transport route 20 or of the individual transport segments TSk, TSk+1 due to the temperature to be expected during operation of the transport apparatus 1. The arrangement of the transport segments TSk, TSk+1 in the manner according to the invention, in particular the uniform tooth pitch $\tau_{ne}=\tau_n$ across a plurality of transport segments TSk, TSk+1 is preferably implemented during assembly of the transport route 20. This means, however, that any changes in the segment spacing s and the tooth pitches $\tau_{ne}$, $\tau_n$ due to heat input into the transport route 20, occurring during operation of the transport apparatus 1, and a resultant thermal expansion, are not taken into account. In particular, thermal expansion of the transport segments TSk, TSk+1 would reduce the tooth pitch $\tau_{ne}$ relative to the tooth pitch $\tau_n$, which is undesirable since the magnetic flux in the joint region 10 would be negatively influenced thereby. However, in most cases of use of the transport apparatus 1, the influence of the thermal expansion on account of heat input can be ignored. However, if particularly high temperatures are anticipated, and thus large thermal expansions are anticipated, it would also be conceivable to arrange the transport segments TSk, TSk+1 in the manner according to the invention such that the uniform tooth pitch $\tau_{ne}=\tau_n$ extending over a plurality of transport segments TSk, TSk+1 results only at a specific anticipated operating temperature, as will be explained in the following.

During operation of the transport apparatus 1, heat input into the transport segments TSk, TSk+1 usually takes place, caused by an electrical current flow through the drive coils 7, friction of the guide means, ambient conditions such as room temperature, etc. or by heat input from the cargo transported by a transport unit Tn. As a result of this heat input, the transport segments TSk, TSk+1 heat up to a specific temperature which is usually higher than the temperature during assembly of the transport route 20, and the transport segments TSk, TSk+1 are thus of course subject to a certain amount of thermal expansion in the longitudinal direction x, depending on the structural design thereof and depending on the material used. For example, aluminum expands more, under the influence of heat, than iron or steel. This relationship should be taken into account when selecting the materials and in the structural design of a transport route 20. The segment spacing s allows said thermal expansion in the longitudinal direction x.

The heat input and the temperature of the transport segments TSk, TSk+1 during operation of the transport apparatus 1 can be estimated in advance due to the known structural design and the desired operation of the transport apparatus 1. This anticipated temperature is referred to in the following as the operating temperature. If no, or only a small, heat input into the transport segments TSk, TSk+1 is anticipated, the operating temperature substantially corresponds to the ambient temperature, and the thermal expansion is accordingly low and can be ignored.

The segment spacing s may, for example, reduce, on account of heat input during operation of the transport apparatus 1, from an initial segment spacing $s_0$ to the segment spacing $s<s_0$ at the operating temperature. This understandably of course requires the structure of the transport segments TSk, TSk+1, viewed in the longitudinal direction x, to be such that said segments can be arranged so as to be mutually spaced at least by the initial segment spacing $s_0$. This circumstance is taken into account according to the invention in that the spacing I between the coil center of an end coil 7e of a transport segment TSk, TSk+1 and the relevant end of the transport segment TSk, TSk+1 is less than half the tooth pitch $$\frac{\tau_{ne}}{2}$$

of the two adjacent end coils 7e of the transport segments TSk, TSk+1. If the operating temperature is in the range of the ambient temperature, the thermal expansion of the transport segments TSk, TSk+1 is small enough to be ignored, and so the initial segment spacing $s_0$ substantially corresponds to the segment spacing s at the operating temperature.

The embodiment of the transport apparatus 1 according to the invention makes it possible to ensure that disturbances on the transport unit Tn that occur during operation of the transport apparatus 1 and result from a non-uniform magnetic flux owing to a tooth pitch $\tau_{ne}$ of the end coils 7e ($\tau_n \neq \tau_{ne}$) that differs from the tooth pitch $\tau_n$, are reduced in the joint region 10 between two transport segments TSk, TSk+1. Both too large a tooth pitch $\tau_{ne}>T_n$ and too small a tooth pitch $\tau_{ne}<T_n$ are disadvantageous. The materials and dimensions of the transport segments TSk can for example also be selected such that, at the operating temperature that is anticipated and that occurs during operation, a tooth pitch $\tau_{ne}$ of the end coils 7e results that corresponds to the tooth pitch $\tau_n$ of the transport segments TSk, TSk+1. In this case, "corresponds" of course does not mean exact matching, but instead matching that is as precise as possible. Preferably, however, at the operating temperature the tooth pitch $\tau_{ne}$ between the end coils 7e should be in the range of ±20% of the tooth pitch $\tau_n$ of the drive coils 7 of the transport segments TSk, TSk+1.

For example, during assembly of the transport segments TSk, TSk+1 (e.g. at room temperature), the tooth pitch $\tau_{ne}$ may be greater than the tooth pitch $\tau_n$, and may reach the value of the tooth pitch $T_n$, owing to thermal expansion, only during operation when an operating temperature is reached that is higher than room temperature. However, the operating temperature could, of course, also be in the range of room temperature, in which case the value of the tooth pitch $\tau_{ne}$ would be substantially similar to the value $\tau_n$ and would not change, or would change only slightly, during operation.

The maximum segment spacing $s_{max}$ is advantageously 1% of the average value of the overall lengths G1, G2 of two adjacent transport segments TSk, TSk+1, or is set such that the spacing I between the coil center of an end coil 7e of a transport segment TSk, TSk+1 and the relevant end of the transport segment TSk, TSk+1 corresponds to half the coil width $$\frac{b}{2}$$

of a drive coil 7, 8, the outer coil end of the end coil 7e of the relevant transport segment TSk, TSk+1 preferably ending flush, in the longitudinal direction, with the relevant end of the transport segment TSk, TSk+1. In this case, the region of the end coil 7e that extends furthest in the longitudinal direction and faces the end of the transport segment TSk, TSk+1 is referred to as the coil end. Transport segments TSk, TSk+1 exist in various embodiments and lengths, the thermal expansion of course increasing with the overall length of the transport segment TSk, TSk+1. Accordingly, in the event of the same temperature increase in two transport segments TSk, TSk+1 having overall lengths G1>G2, the transport segment TSk having the overall length G1 would experience greater thermal expansion than the transport segment TSk+1 having the overall length G2. As a result of the described plurality of embodiments of the transport segments TSk, TSk+1, in particular with respect to the overall length G1, G2 thereof and the associated very different thermal expansions, it is expedient to base the maximum segment spacing $s_{max}$ on the overall lengths G1, G2 of the transport segments TSk, TSk+1 instead of on an absolute measurement indication. The maximum segment spacing $s_{max}$ is advantageously set such that the outer coil end of the end coil 7e of the relevant transport segment TSk, TSk+1 preferably ends flush, in the longitudinal direction, with the relevant end of the transport segment TSk, TSk+1. This ensures that the end coil 7e does not protrude beyond the end of the transport segment TSk, TSk+1, and thus the electromagnetic circuit of the end coil 7e is not adversely affected.

Preferably, however, a minimum segment spacing $s_{min}$ is also set such that, at a defined maximum temperature, the adjacent transport segments TSk, TSk+1 do not touch. In order to achieve as uniform as possible a magnetic flux in the joint region 10 between the transport segments TSk, TSk+1, it is advantageous to keep the segment spacing s (and thus the magnetic reluctance of the air gap between the transport segments TSk, TSk+1) as small as possible. It is necessary to ensure, however, that no contact between the transport segments TSk, TSk+1 occurs in the event of thermal expansion of the transport segments TSk, TSk+1. The transport segments TSk, TSk+1 touching could, in the event of further thermal expansion, lead to mechanical stresses in the transport segments TSk, TSk+1 or even deformations of the transport segments TSk, TSk+1 and thus of the transport route 20, which should be prevented as far as possible.

According to a further embodiment of the invention, it is advantageous for a preferably resilient material 3 having a magnetic permeability µ to be arranged in the joint region 10 between adjacent transport segments TSk, TSk+1, the magnetic permeability µ being greater than that of air at least by the factor of 10, preferably at least by the factor of 100. Magnetic pastes, elastomers, rubber, etc. would be conceivable for example, which materials are introduced into the joint region 10 between two transport segments TSk, TSk+1. In this context, high magnetic permeability µ means a magnetic permeability µ that is at least significantly (at least by the factor of 10) greater than that of air, preferably in the region of the core 13. The ideally elastic deformability of the material 3 means that the segment spacing s can be bridged even if the transport segments TSk, TSk+1 expand due to heat input (or shrink upon cooling) and the segment spacing s thus changes. Introducing the material 3 makes it possible to increase the magnetic flux in the region between the transport segments TSk, TSk+1 and to further reduce disturbances acting on the transport unit Tn during operation of the transport apparatus 1.

Figure 3:
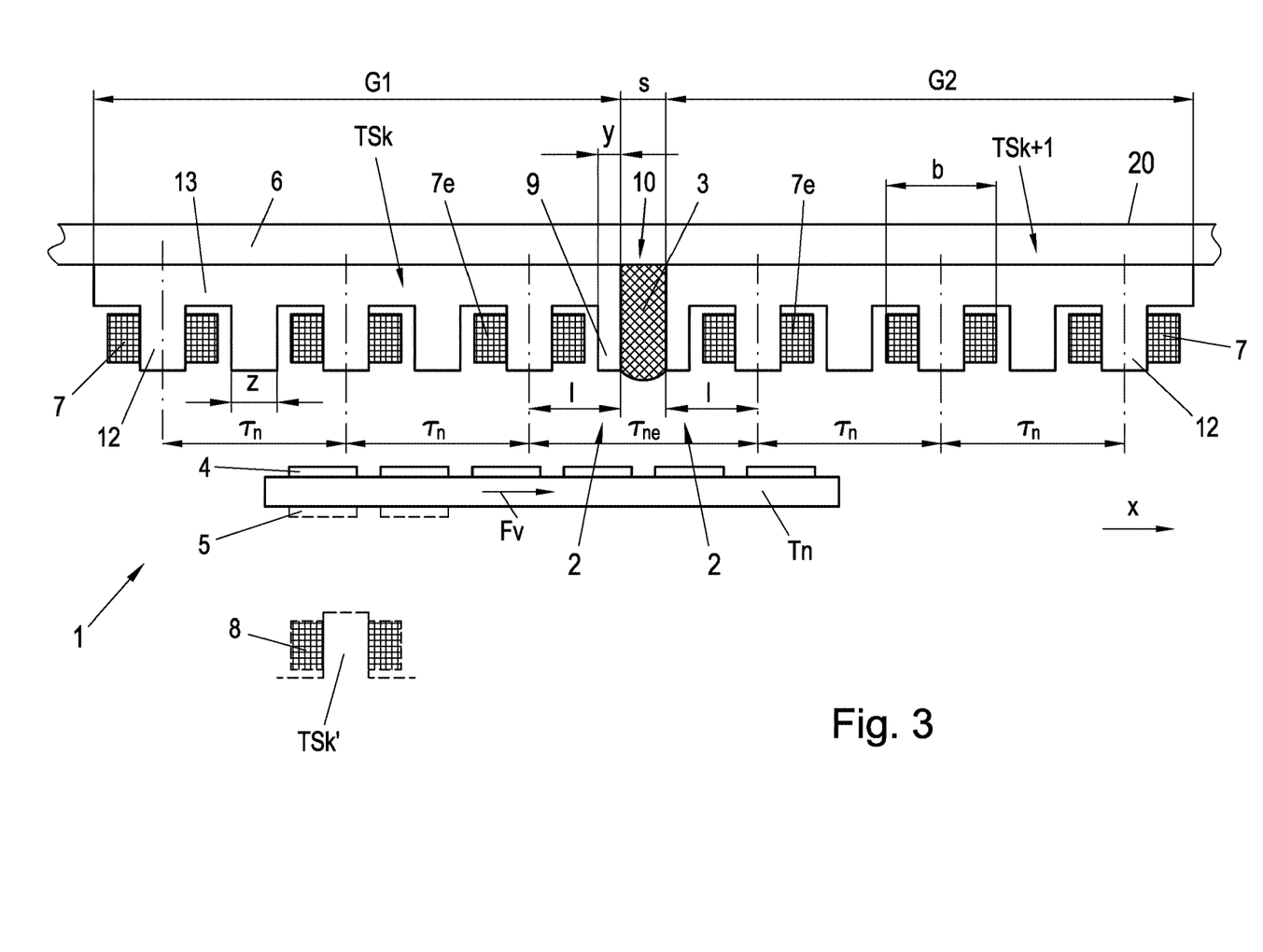
FIG. 3 shows a further detail of two adjacent, straight transport segments.

FIG. 3 shows a further embodiment of the invention. According to the invention, the end portions 2 of the core 13 of the transport segments TSk, TSk+1, viewed in the longitudinal direction x, comprise toothlike extensions 9. In an advantageous embodiment of the transport segments TSk, TSk+1, it would be possible to form a joint region 10 that is approximately free of disturbances resulting from a non-uniform magnetic flux. Advantageously, for example the width y of a toothlike extension 9 could be selected so as to be in the range of half the tooth width z of a tooth 12 of the core 13, and the segment spacing s could for example be selected so as to be minimal, preferably in the range of a few tenths of a mm, when a defined maximum temperature is reached. The remaining segment spacing s could in addition be filled, as described, with a preferably resilient material 3 having a magnetic permeability µ, the magnetic permeability µ being greater than that of air at least by the factor of 10, preferably at least by the factor of 100. Accordingly, a joint region 10 would be created between the transport segments TSk, TSk+1 that behaves in approximately the same manner, with respect to the magnetic flux, as the remaining portions of the transport segments TSk, as a result of which approximately disturbance-free operation of the transport apparatus 1 or of the transport unit Tn is achieved in the joint region 10 between individual transport segments TSk, TSk+1.

Figure 4:
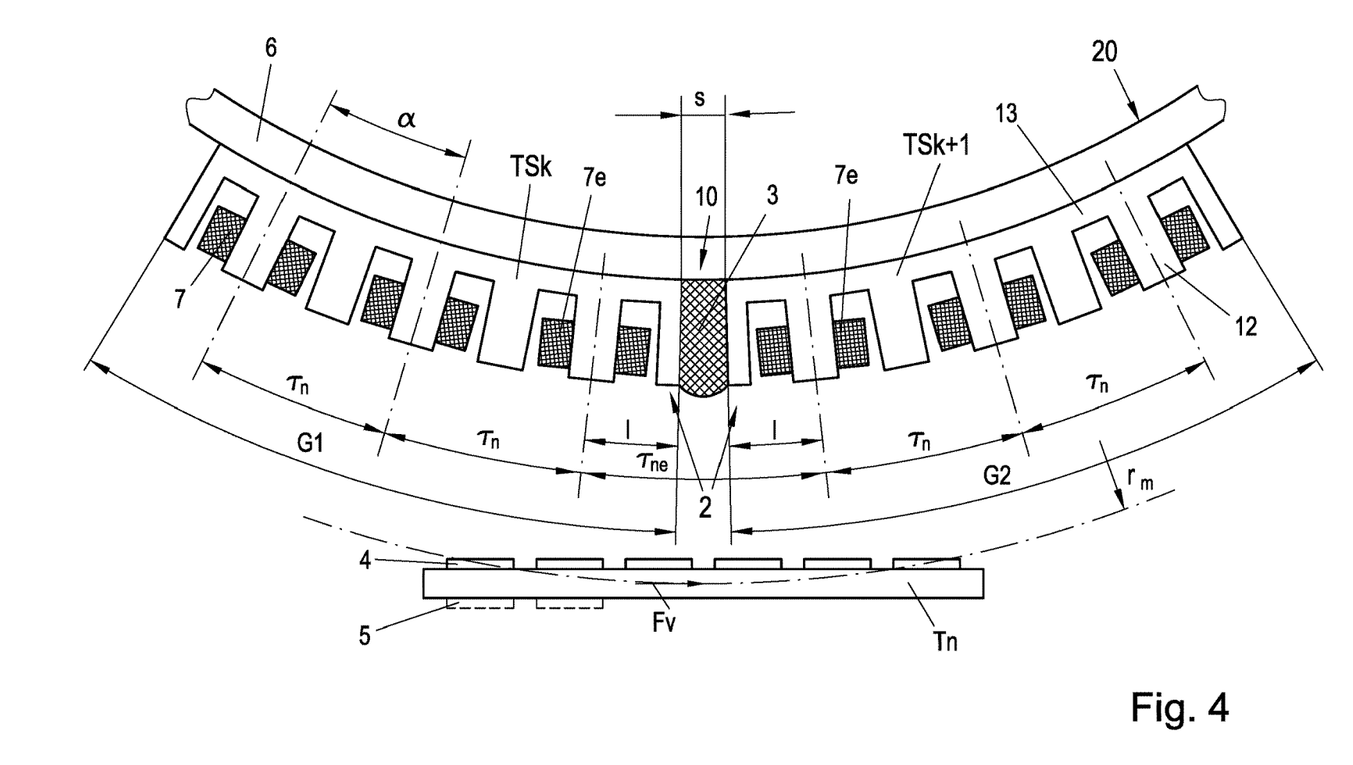
FIG. 4 shows a detail of two adjacent, curved transport segments.

Although the embodiment of the invention described thus far has been set out only with reference to the straight transport segments TSk, TSk+1 shown in FIG. 2 and FIG. 3, the inventive concept of course also covers all other conceivable transport segments TSk, for example curved transport segments TSk, TSk+1 shown in FIG. 4 or also all other conceivable embodiments of transport segments TSk. In the same way as in the case of the straight embodiment, the features according to the invention can also be achieved in the case of the curved transport segments TSk, TSk+1 in FIG. 4. According to the invention, the transport segments TSk, TSk+1 are designed such that the spacing I between the coil center of an end coil 7e of a transport segment TSk, TSk+1 and the relevant end of the transport segment TSk, TSk+1 is less than half the tooth pitch $$\frac{\tau_{ne}}{2}$$

of the two adjacent end coils 7e of the transport segments TSk, TSk+1, the tooth pitch $\tau_{ne}$ of the two adjacent end coils 7e preferably corresponding to the tooth pitch $\tau_n$ of the drive coils 7, 8 of at least one of the transport segments TSk, TSk+1. In this case, for curved transport segments TSk, TSk+1, the spacing I, the end of a transport segment TSk, TSk+1 and the tooth pitch $T_{ne}$ or the tooth pitch $T_n$ are preferably specified in a radian measure at a specified radius $r_m$.

The end portions 2 of transport segments TSk are preferably generally designed such that any desired combination of different transport segments TSk is possible, and therefore as flexible as possible a design of a transport route is made possible. In FIG. 2 and FIG. 3, straight transport segments TSk, TSk+1 are combined, and in FIG. 4 curved transport segments TSk, TSk+1 are combined. It would of course also be conceivable, however, to combine straight transport segments TSk with curved transport segments TSk. Depending on the curvature of the transport segments TSk, the drive coils 7 of the transport segment TSk are arranged at a coil angle α relative to one another, the coil angle α changing according to the curvature. For example, there may be transport segments TSk that have a constant curvature over the length thereof (such as a circular arc), but also transport segments TSk of which the curvature changes over the length of the transport segment TSk, for example an S-shaped transport segment TSk.

In the case of two curved transport segments TSk, TSk+1, as shown in FIG. 4, for example the spacing I, the tooth pitch $\tau_n$, and the tooth pitch $\tau_{ne}$ could be used as the radian measure at a specific radius $r_m$, for example at the radius $r_m$ of the movement path of the transport unit Tn (see the dashed line in FIG. 4). In order to define the maximum segment spacing $s_{max}$, the overall lengths G1, G2 of the transport segments TSk, TSk+1, as well as the coil width b (similar to the tooth pitch $\tau_n$), are also specified in a radian measure.

When combining curved transport segments TSk, too, it is of course advantageous to introduce a preferably resilient material 3 having a high magnetic permeability μ into the joint region 10 between two transport segments TSk, TSk+1 in order to increase the magnetic permeability μ. In addition, toothlike extensions 9 can again be provided, which extensions also contribute to increasing the magnetic permeability μ or the magnetic flux, and thus to reducing the disturbances, in the joint region 10 between two transport segments TSk, TSk+1.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A transport apparatus in the form of a long stator linear motor comprising:
   at least two adjacent transport segments that are mutually spaced in the longitudinal direction by a segment spacing,
   a plurality of drive coils, mutually spaced by a tooth pitch, being arranged, in the longitudinal direction, on each of the two transport segments,
   wherein a spacing, in the longitudinal direction, between a coil center of an end coil of a transport segment and an adjacent end of the transport segment is smaller than half a tooth pitch of adjacent end coils of the at least two mutually spaced transport segments, and
   wherein a tooth pitch of the two adjacent end coils corresponds to the tooth pitch of the drive coils of at least one of the transport segments.

2. The transport apparatus according to claim 1, wherein the tooth pitches of the drive coils of adjacent transport segments are of the same size.

3. The transport apparatus according to claim 1, wherein a maximum segment spacing is 1% of an average value of a total length of two adjacent transport segments.

4. The transport apparatus according to claim 1, wherein a maximum segment spacing is set such that the spacing between the coil center of the end coil of the transport segment and the adjacent end of the transport segment corresponds to half a coil width of a drive coil.

5. The transport apparatus according to claim 1, wherein a minimum segment spacing is set such that, at a defined maximum temperature, the adjacent transport segments do not touch.

6. The transport apparatus according to claim 1, wherein a resilient material is arranged in a joint region between adjacent mutually spaced transport segments.

7. The transport apparatus according to claim 1, wherein toothlike extensions are provided on end portions of the transport segments.

8. The transport apparatus according to claim 4, wherein an outer coil end of the end coil of the transport segment, in the longitudinal direction, ends flush with the adjacent end of the transport segment.

9. The transport apparatus according to claim 6, wherein the resilient material has a magnetic permeability greater than that of air at least by a factor of 10.

10. The transport apparatus according to claim 6, wherein the resilient material has a magnetic permeability greater than that of air at least by a factor of 100.

* * * * *